June 10, 1924.

A. W. WARD

COMPRESSED AIR PUMP

Filed Oct. 14, 1921

Andrew W. Ward,
INVENTOR,

WITNESSES

BY

ATTORNEY

June 10, 1924.
A. W. WARD
COMPRESSED AIR PUMP
Filed Oct. 14, 1921
1,497,621
2 Sheets-Sheet 2
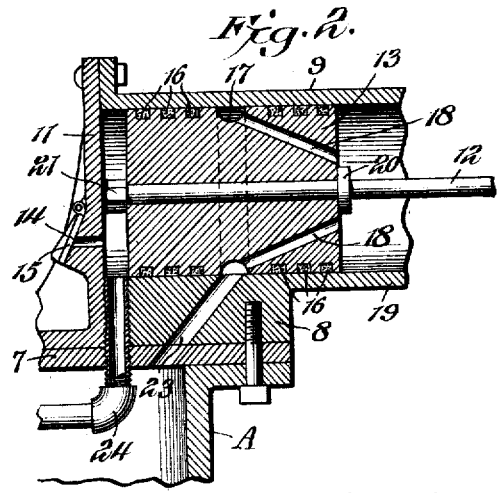
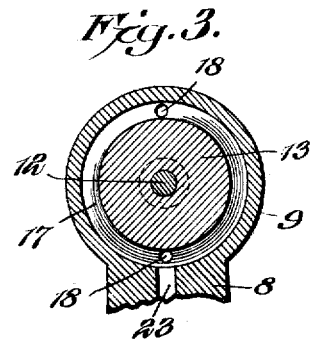
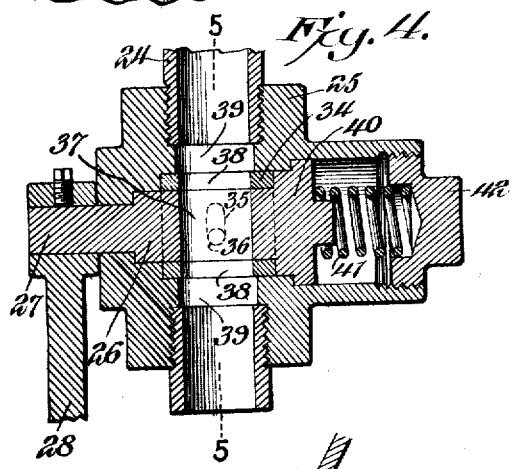
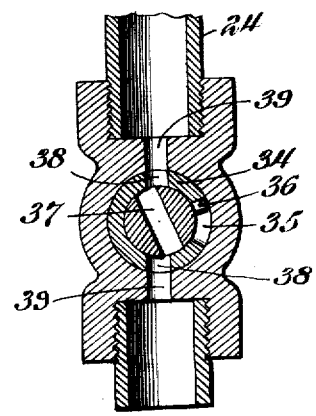
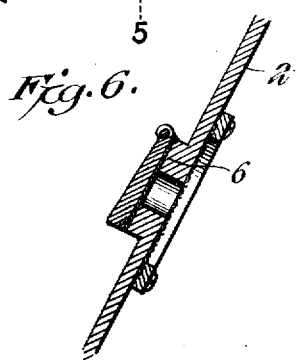
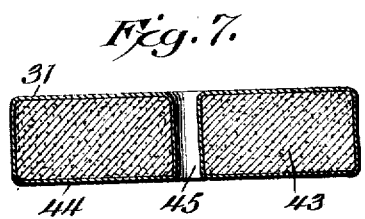
Andrew W. Ward,
INVENTOR, Patented June 10, 1924.

1,497,621

UNITED STATES PATENT OFFICE.

ANDREW W. WARD, OF CHARLESTON, WEST VIRGINIA, ASSIGNOR OF ONE-FOURTH TO CLARK M. McVAY, ONE-FOURTH TO CHARLES F. WARD, AND ONE-FOURTH TO FRANK S. FISHER, ALL OF CHARLESTON, WEST VIRGINIA.

COMPRESSED-AIR PUMP.

Application filed October 14, 1921. Serial No. 507,609.

*To all whom it may concern:*

Be it known that I, ANDREW W. WARD, a citizen of the United States, residing at Charleston, in the county of Kanawha and State of West Virginia, have invented a new and useful Compressed-Air Pump, of which the following is a specification.

This invention has reference to compressed air pumps of the two-cylinder type, wherein compressed air is used as the impelling agent and is admitted to the cylinders in alternation, to discharge water from one cylinder while admitting a charge of water to the other cylinder, whereby the flow of water from the two cylinders combined is substantially continuous.

The invention comprises two like cylinders of appropriate size each terminating at the lower end in a funnel with the funnels opening into individual ducts joining a single or common duct, and each including a one-way check valve so that there may be no escape of water leaving the pump except through the common duct. Each funnel contains an inwardly-opening check valve to admit water to the respective funnel and cylinder from a reservoir or body of water in which the two cylinders are immersed. Each cylinder contains an upright guide for controlling the travel of a float mounted on the guide and each cylinder is provided with a dome containing a rotary valve connected to the respective guide in such a manner that when the float reaches the high point of its travel, the float engages a stop on the guide to close a rotary valve, and each guide has another stop engaged by the float at the lower limit of its travel to cause the opening of the rotary valve.

The two domes are inter-connected by a common valve casing in which is mounted a double-ended reciprocatory valve controlled by compressed air admitted to the respective ends of the double-ended valve and connected to a supply of compressed air. The common valve casing has a check valve at each end opening to the atmosphere and arranged to pass air exhausted from the respective cylinders to permit the inflow of water from the reservoir or other body of water in which the cylinders are immersed. After a cylinder has filled with water through a check valve admitting such inflow, the water is caused to subsequently pass from the cylinder, by the action of compressed air admitted to the cylinder, through the intermediary of a reciprocatory valve automatically operated for the purpose.

With the structure furnished with a continuous supply of compressed air, such air is diverted intermittently to the two cylinders in succession, whereby water is expelled from one cylinder while the other cylinder is filling, and the action of the pump is therefore continuous and automatic, requiring no attention after being once started, with the only moving parts including the floats and certain valves, responsive to the floats and controlling the admission and escape of water and compressed air.

The invention will be best understood from a consideration of the following detailed description taken in connection with the accompanying drawings forming a part of this specification, with the understanding, however, that the invention is not confined to any strict conformity with the showing of the drawings, but may be changed and modified, so long as such changes and modifications mark no material departure from the salient features of the invention as expressed in the appended claims.

In the drawings:—

Fig. 1 is a longitudinal vertical section of a pump embodying the invention.

Fig. 2 is a longitudinal section centrally through one end of a double reciprocatory valve forming part of the invention.

Fig. 3 is a transverse section through one of the pistons and the adjacent portion of the cylinder controlling the compressed air.

Fig. 4 is a longitudinal section of the exhaust valve.

Fig. 5 is a section on the line 5—5 of Fig. 4.

Fig. 6 is a section through one of the check valves shown in Fig. 1, for admitting water to the cylinders.

Fig. 7 is a diametric section through one of the floats, shown in Fig. 1.

Referring to the drawings, there are shown two cylinders A and B, of substantially identical structure, each cylinder having a dome 1 at the upper end and a funnel shaped extension 2 at the lower end. At the lower end of each funnel 2 there is an outlet pipe 3, including a check valve 4, with the two outlet pipes joined at the ends remote from the respective funnels 2, by a pipe 5 common to both pipes 3 and which may in turn be connected to a single pipe 5ª. Each funnel 2 is furnished with an intake check valve 6, permitting water to flow into the funnel but preventing escape of water therefrom, except through the outlet pipes 3.

Each dome is furnished with a cover plate 7, carrying the respective ends 8 of a cylinder 9, secured to the cover plate 7, by screws 10, or otherwise, the ends of the pipe being closed by heads 11 fast to the plate 7 and to the ends of the cylinder. The cylinder 9 is designed to contain a piston rod 12, carrying at each end a piston 13, the piston being best shown in Fig. 2. The heads 11 are each provided with a port or bleed hole 14, opening from the interior of the cylinder 9, and carrying an outwardly opening check valve 15, which may be conveniently formed as a gravity check valve, although such particular structure is not obligatory.

Each piston 13 is supplied with suitable piston rings 16, to make the piston airtight, and intermediate of its length each piston is encircled by a groove 17, from which lead channels 18, placing the groove 17 in communication with the bore of the cylinder 9, intermediate of the ends of the cylinder 9. Each piston is traversed by the piston rod 12, which latter is provided with a stop 20 at one end and a nut 21 at the other end, whereby the piston is clamped to the piston rod. The nut 21 may be conveniently made long enough to serve as a stop engaging the head 11, so that the piston can only approach but not touch the end of the cylinder 9 so as to leave a space 22, between the piston and the respective head of the cylinder.

When the piston is brought to a position defining the nearest approach of the piston to the head of the cylinder, the groove 17 is brought into coincidence with a passage 23, leading to the base of the head 11, and continued through the plate 7 to the interior of the cylinder A or B, as the case may be.

Leading from each chamber 22 to the interior of the respectve cylinder A or B, is a pipe 24, suitably bent to locate its inner end where the pipe is connected to one end of a valve casing 25, housing a rotary valve 26, provided at one end with a valve stem 27, to which is secured a crank 28, in turn made fast to a coupling link 29 connecting the crank to a guide rod 30, serving as a support and extending through a float 31, there being such a float and a guide rod 30 in each cylinder A and B. Each guide rod 30 passes through a guide strip 32 at the lower end of the respective cylinder A and B, and, near the upper end, each guide rod 30 has fast thereto a stop 33, movable with the rod. Each rotary valve 26 within the valve casing 25 is surrounded by a sleeve 34, having a slot 35 therethrough to receive a pin 36, whereby the valve 26 and sleeve 34 are permitted to have relative rotative movements independently of each other. Extending diametrically of the valve 26 is a port 37, and extending diametrically of the sleeve 34 are matching ports 38, while the valve casing 25 has opposed ports 39 therethrough.

One end of the valve 26 is seated in the valve casing 25 and the other end of the valve has a head 40 seated in the other side of the valve casing 25. When the valve is installed, it is held in place by a spring 41, clamped to the valve casing by a nut 42, so as to maintain the valve frictionally in the casing and yet permitting the turning of the valve with comparative ease.

When the pin 36 is at one end of the slot 35, the ports 37, 38 and 39 are in alinement, but when the valve is rotated in the proper direction, the port 37 moves part of the way out of alinement with the ports 38, so as to reduce the flow through the valve, while further movement of the valve causes the pin 36 to engage the sleeve 34 and ultimately close the valve against any flow of fluid therethrough.

Each float 31, shown separately in Fig. 7, comprises a buoyant body 43 enclosed in a metal shell 44 and provided with a central passage 45 through it, to permit the float to travel freely along the rod 30. The body 43 may be conveniently made of cork and the shell 44 may be conveniently made of sheet copper, the cork imparting firmness to the float as well as buoyancy.

Let it be considered that the cylinders A and B are suitably immersed in a body 46 of water, and the cylinder A is filled with water up into the dome 1, as shown in Fig. 1, the valve 26 in the cylinder A being closed, and the valve 26 in the cylinder B being open. Moreover, let it be assumed that air pressure is established in the cylinder 9 from a suitable source of compressed air supply. When the cylinder B has become filled with water, the float 31 rises until it comes in contact with a flange 47 surrounding the lower end of the dome 1 and located within the cylinder B. When the float 31 rises to nearly the upper limit of its travel in the cylinder A, it engages and causes an elevation of the guide rod 30 and correspondingly rotates the valve stem 27, resulting in closing the valve 26 as soon as the pin 36 has reached the corresponding end of the slot 35 and appropriately rotated the valve 26 a small distance further, so that the ports 37 and 38 are wholly closed and further passage of water through the valve is cut off, the full rotation of the valve occurring when the float 37 is arrested by engagement with the flange 47.

While the cylinder B is being filled with water, the cylinder A is being emptied of water by the inflow of compressed air from the cylinder 9 through the corresponding piston 13 and passage 23 to the interior of the cylinder A. As the water is discharged from the cylinder A, the float 31 therein follows the lowering level of the water until said float finally engages the lower stop 31 and actuates the rod 30 and parts connected thereto, to open the corresponding valve 26. The filling of a cylinder will take place at a more rapid rate than the emptying of the other cylinder, so that the valve 26 in the cylinder B will be closed before the corresponding valve in the cylinder A is opened. At the moment when both valves are closed, the pressure of the compressed air on the two pistons 13 will, of course, be equal and the pistons will remain stationary. As soon, however, as one of the valves 26 is opened, compressed air will be admitted through the pipe 24 into the corresponding end of the cylinder 9 at a rate faster than it can escape through the restricted port 14. The compressed air, therefore, will act on the piston head 21 at that end of the cylinder and cause the piston to be shifted before atmospheric pressure is restored by escape of the air through the port 14 and valve 15. Thus, the operation of filling one cylinder and emptying the other is reversed.

The operation of the pump is therefore alternately continuous so long as there is a supply of water and compressed air.

What is claimed is:—

1. A compressed air pump, comprising a pair of upright closed cylinders, each with a guided float therein having a range of travel to fill and approximately empty the cylinders in alternation, a reciprocatory valve assembly and casing common to and connecting the upper ends of the two cylinders, means for supplying compressed air through said valve assembly to the cylinders in alternation, means for actuating the valve assembly, including a valve for each cylinder under control of the float therein and controlling the communication between that cylinder and the adjacent end of the valve assembly casing, said casing having a small exhaust port at each end, and a check valve for said exhaust port, preventing a return flow into said casing.

2. A compressed air pump, comprising a pair of closed compartments, each with a guided float therein having a range of travel to fill and approximately empty the cylinders in alternation, a reciprocatory valve assembly and casing common to and connecting the upper ends of the two compartments, means for supplying compressed air through said valve assembly to the compartments in alternation, means for actuating the valve assembly including a rotary valve for each compartment under control of the float therein and controlling the communication between that compartment and the adjacent end of the valve assembly casing, said rotary valve having a range of inactive movement, and another range of active movement immediately succeeding in time the first range of movement and causing the complete closing of the valve, said valve assembly casing having a small exhaust port at each end, and a check valve for said exhaust port, preventing a return flow into said casing.

3. A compressed air pump, comprising a pair of upright cylinders, each having a valve for discharging from the interior of the cylinder to the atmosphere, means for opening either valve when its respective cylinder becomes approximately empty and for closing it when the cylinder becomes filled, a valve for controlling the admission of pressure alternately to the cylinders and shiftable in response to the shifting of the valves in the cylinders.

4. A compressed air pump, comprising a pair of upright closed cylinders, a rotary valve in each cylinder discharging from the interior of the cylinder to the atmosphere, means for opening each valve as the cylinder becomes empty and for closing it when the cylinders become filled, and a reciprocating valve common to both cylinders and responsive to rising and falling levels of liquid in the pump to shift the pressure to the cylinder which has been filled.

5. A compressed air pump comprising a pair of upright closed cylinders, a rotary valve individual to each of the cylinders, an exhaust port in communication with each rotary valve, a check valve for each port preventing a back flow, means for shifting said rotary valves as one cylinder becomes full and the other empty, a reciprocatory valve common to the two cylinders and operable to control the pressure therein, and inlet valves individual to the cylinders and responsive to rising and falling levels of liquid in the pump.

6. A compressed air pump comprising a pair of upright closed cylinders, a rotary valve individual to each of the cylinders and having a range of travel to fill and approximately empty said cylinders in alternation, a reciprocatory valve common to the two cylinders, and inlet valves individual to the cylinders and responsive to rising and falling levels of liquid in the pump, the rotary valves each having a range of lost motion whereby the valves will remain open until the filling of the respective cylinders is substantially completed.

7. A compressed air pump comprising a pair of upright closed cylinders, a rotary valve individual to the cylinders and having a range of travel to fill and approximately empty said cylinders in alternation, a reciprocatory valve common to the two cylinders, and other valves individual to the cylinders and responsive to rising and falling levels of liquid in the pump, the rotary valves each having a range of lost motion whereby the valves will remain open until the filling of the respective cylinders is substantially completed, and check valves controlling the admission of liquid to the cylinders from the exterior thereof and responsive to inflow of liquid to the cylinders.

8. A compressed air pump comprising a pair of upright closed cylinders, a rotary valve individual to the cylinders and having a range of travel to fill and approximately empty said cylinders in alternation, a reciprocatory valve common to the two cylinders, and other valves individual to the cylinders and responsive to rising and falling levels of liquid in the pump, the rotary valves each having a range of lost motion whereby the valves will remain open until the filling of the respective cylinders is substantially completed, and check valves controlling the admission of liquid to the cylinders from the exterior thereof and responsive to inflow of liquid to the cylinders, each cylinder being of conical form and having a check valve, and connected escape pipes leading from the conical terminations and each provided with a check valve in addition to the first-named check valve and opening away from the conical termination.

9. A compressed air pump comprising a pair of upright closed cylindrical chambers, the lower end of each chamber terminating in a downwardly converging conical bottom, a common discharge pipe connected to each chamber at the vertex of the bottom, an inlet valve in the bottom of each cylinder, means for introducing pressure in alternation to the two cylinders including means for shifting the pressure, as each cylinder becomes empty, to the other cylinder, and a check valve for each cylinder opening outwardly to exhaust the air therefrom while the cylinder is being refilled.

In testimony that I claim the foregoing as my own, I have hereto affixed my signature.

ANDREW W. WARD.